(12) United States Patent
Tanemura et al.

(10) Patent No.: US 10,241,614 B2
(45) Date of Patent: Mar. 26, 2019

(54) OBJECT CLASSIFICATION UNDER LOW-POWER SCAN

(71) Applicant: Synaptics Incorporated, San Jose, CA (US)

(72) Inventors: Tetsuo Tanemura, Tokyo (JP); Guanhua Cao, Shanghai (CN)

(73) Assignee: Synaptics Incorporated, San Jose, CA (US)

( * ) Notice: Subject to any disclaimer, the term of this patent is extended or adjusted under 35 U.S.C. 154(b) by 40 days.

(21) Appl. No.: 15/483,850

(22) Filed: Apr. 10, 2017

(65) Prior Publication Data

US 2018/0292939 A1 Oct. 11, 2018

(51) Int. Cl.
*G06F 3/041* (2006.01)
*G06F 1/3234* (2019.01)
*G06F 3/044* (2006.01)

(52) U.S. Cl.
CPC .......... *G06F 3/0416* (2013.01); *G06F 1/3262* (2013.01); *G06F 3/044* (2013.01); *G06F 2203/04105* (2013.01)

(58) Field of Classification Search
CPC ........ G06F 3/0416; G06F 3/042; G06F 3/043; G06F 3/044; G06F 3/045; G06F 3/046; G06F 3/047; G06F 1/3262; G06F 2203/04105; G06K 9/00228; G02F 1/13338

See application file for complete search history.

(56) References Cited

U.S. PATENT DOCUMENTS

| | | | | |
|---|---|---|---|---|
| 4,755,953 A | * | 7/1988 | Geithman | G01N 29/11 702/39 |
| 6,504,530 B1 | * | 1/2003 | Wilson | G06F 3/0418 345/173 |
| 7,903,841 B2 | * | 3/2011 | Smilansky | G06K 9/3241 348/143 |
| 9,524,060 B2 | * | 12/2016 | Drumm | G06F 3/0421 |
| 2010/0271300 A1 | * | 10/2010 | Hsu | G06F 3/04883 345/158 |
| 2012/0044199 A1 | * | 2/2012 | Karpin | G06F 3/0416 345/174 |
| 2013/0027218 A1 | * | 1/2013 | Schwarz | G01D 4/002 340/870.02 |
| 2013/0154982 A1 | * | 6/2013 | Hotelling | G06F 3/0485 345/173 |
| 2013/0194200 A1 | * | 8/2013 | Zanone | G06F 3/0418 345/173 |

(Continued)

OTHER PUBLICATIONS

Chethan, "Proximity Sensing with CapSense" Jan. 20, 2016 (62 pages).

*Primary Examiner* — Tom V Sheng
(74) *Attorney, Agent, or Firm* — Ferguson Braswell Fraser Kubasta PC

(57) ABSTRACT

A method may include performing a first low-power scan to detect an input object in a sensing region of an input device. The method may further include determining, using the first low-power scan, whether the input object is an object of interest. The method may further include performing a high-power scan of the sensing region when the input object is an object of interest. The method may further include performing a second low-power scan of the sensing region when the input object is an object of no interest.

17 Claims, 7 Drawing Sheets

(56) References Cited

U.S. PATENT DOCUMENTS

| | | | |
|---|---|---|---|
| 2013/0194201 A1* | 8/2013 | Zanone | G06F 3/0418 |
| | | | 345/173 |
| 2014/0160075 A1* | 6/2014 | Chen | G06F 3/0428 |
| | | | 345/175 |
| 2016/0147339 A1* | 5/2016 | Teranishi | G06F 3/044 |
| | | | 345/174 |
| 2017/0003785 A1* | 1/2017 | Berget | G06F 3/0412 |
| 2017/0242117 A1* | 8/2017 | Izzat | G01S 13/867 |
| 2017/0285161 A1* | 10/2017 | Izzat | G06K 9/3233 |
| 2017/0285905 A1* | 10/2017 | Sato | G06F 3/0488 |
| 2017/0300166 A1* | 10/2017 | Rosenberg | G06F 3/045 |

* cited by examiner

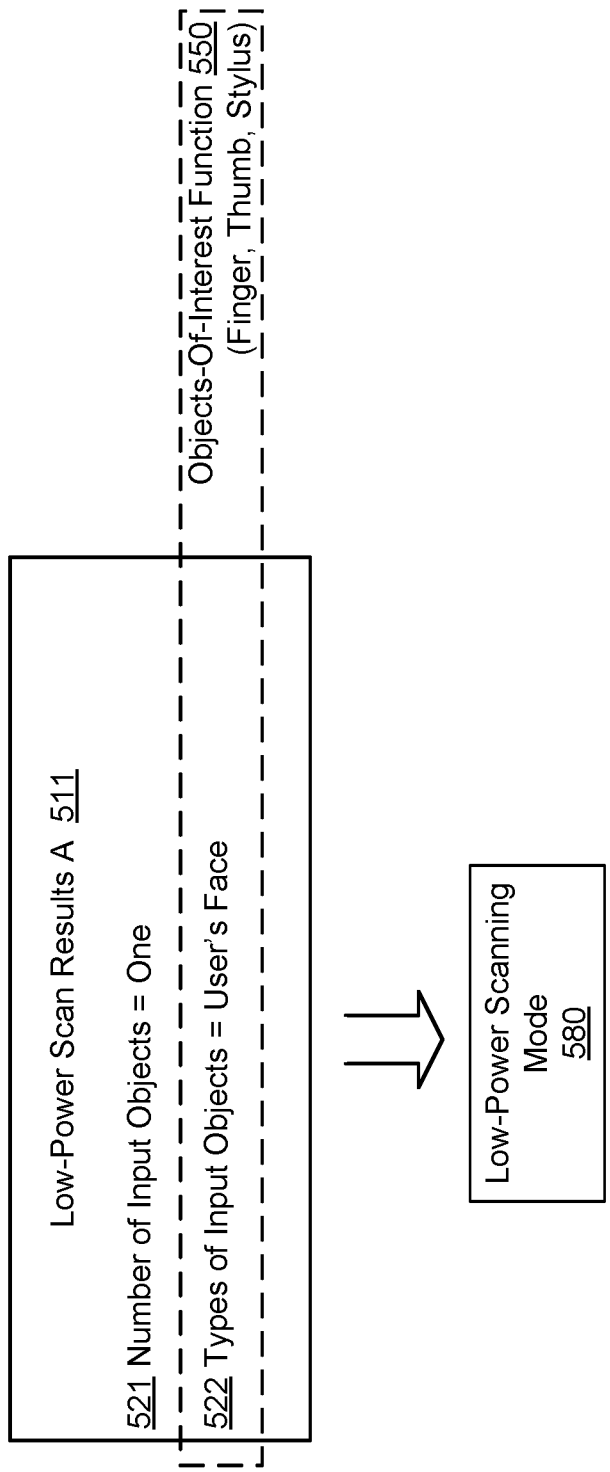
FIG. 5.1

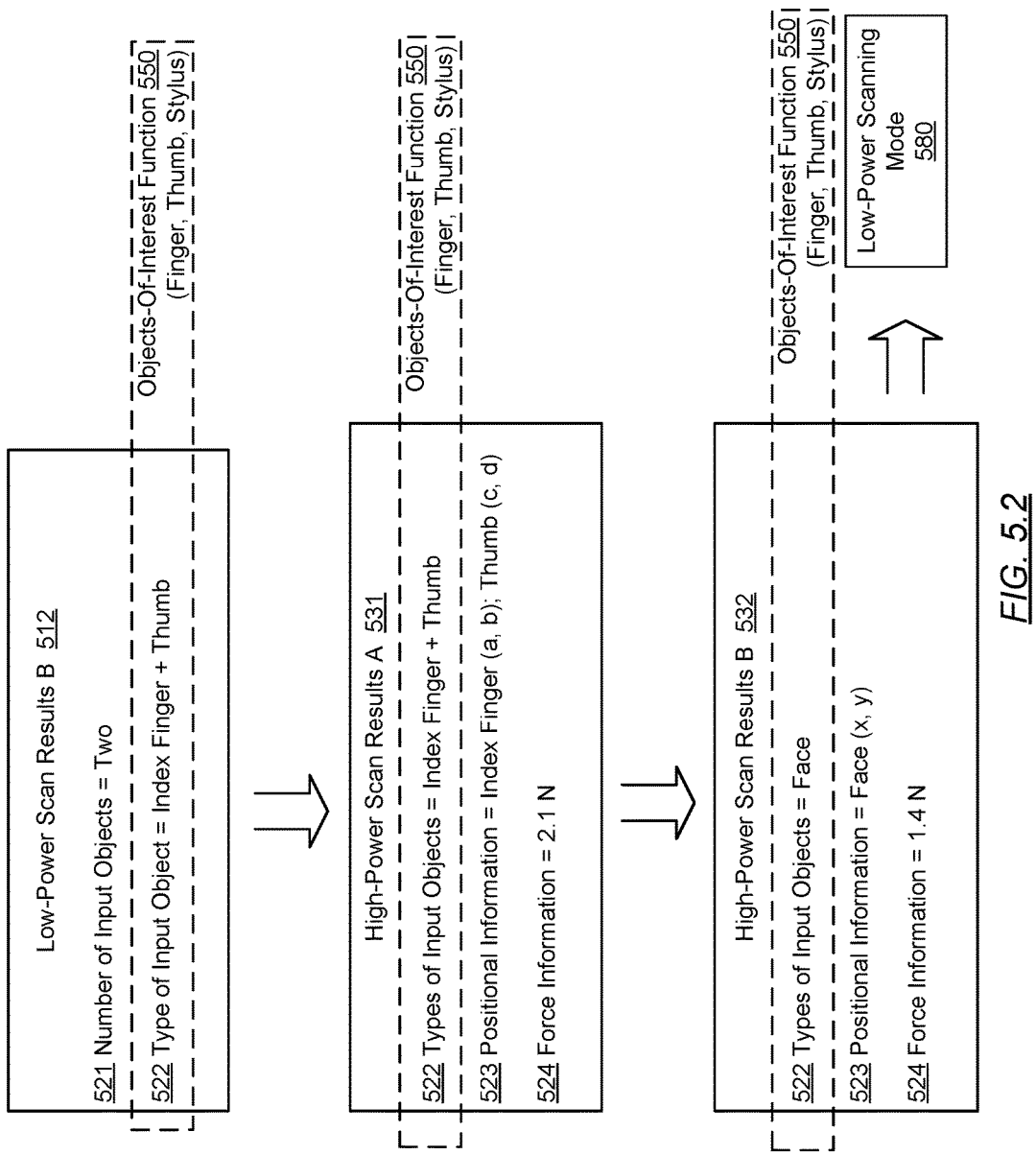
FIG. 5.2

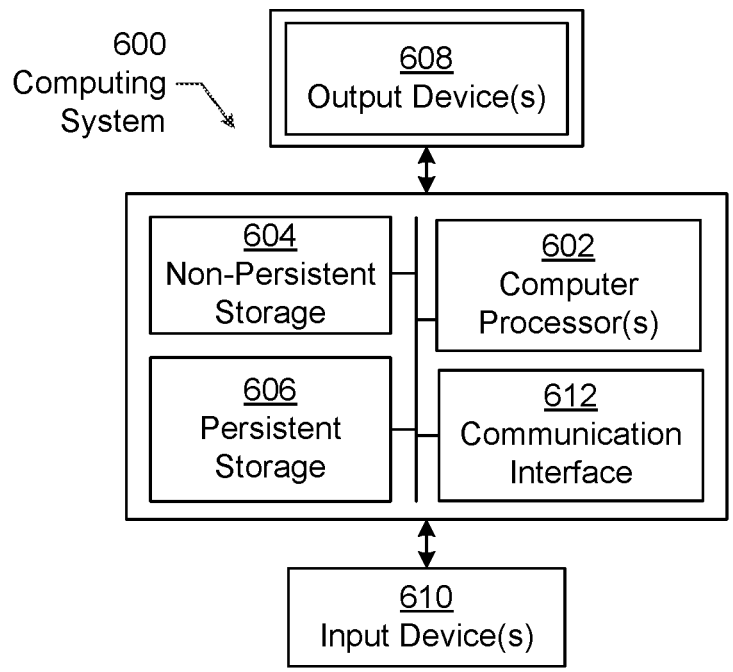
*FIG. 6.1*
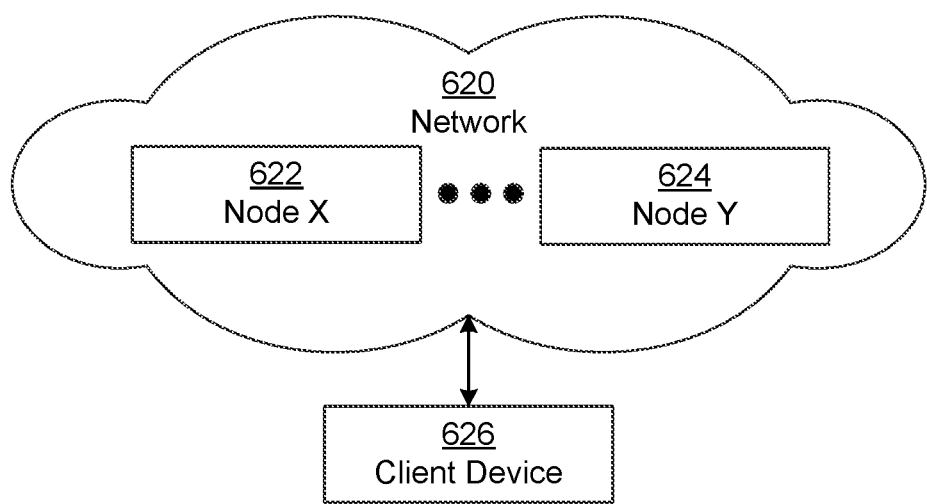
*FIG. 6.2*

OBJECT CLASSIFICATION UNDER LOW-POWER SCAN

FIELD

This invention generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

In general, in one aspect, the invention relates to a processing system coupled with an input device. The processing system includes a sensor module configured to perform a first low-power scan to detect an input object in a sensing region of the input device. The sensor module is further configured to perform a high-power scan of the sensing region when the input object is an object of interest. The sensor module is further configured to perform a second low-power scan of the sensing region when the input object is an object of no interest. The processing system further includes a determination module configured to determine, using the first low-power scan, whether the input object is the object of interest.

In general, in one aspect, the invention relates to an input device. The input device includes various transmitter electrodes configured to transmit various sensing signals. The input device further includes a plurality of receiver electrodes configured to obtain various resulting signals in response to transmitting the sensing signals. The input device further includes a processing system coupled to the receiver electrodes and the transmitter electrodes. The processing system is configured to perform a first low-power scan to detect an input object in a sensing region. The processing system is further configured to determine, using the first low-power scan, whether the input object is an object of interest. The processing system is further configured to perform a high-power scan of the sensing region when the input object is the object of interest. The processing system is further configured to perform a second low-power scan of the sensing region when the input object is an object of no interest.

In general, in one aspect, the invention relates to a method. The method includes performing a first low-power scan to detect an input object in a sensing region of an input device. The method further includes determining, using the first low-power scan, whether the input object is an object of interest. The method further includes performing a high-power scan of the sensing region when the input object is an object of interest. The method further includes performing a second low-power scan of the sensing region when the input object is an object of no interest.

Other aspects of the invention will be apparent from the following description and the appended claims.

BRIEF DESCRIPTION OF DRAWINGS

FIGS. 5.1 and 5.2 show an example in accordance with one or more embodiments.

FIGS. 6.1 and 6.2 show a computing system in accordance with one or more embodiments.

DETAILED DESCRIPTION

Figure 1:
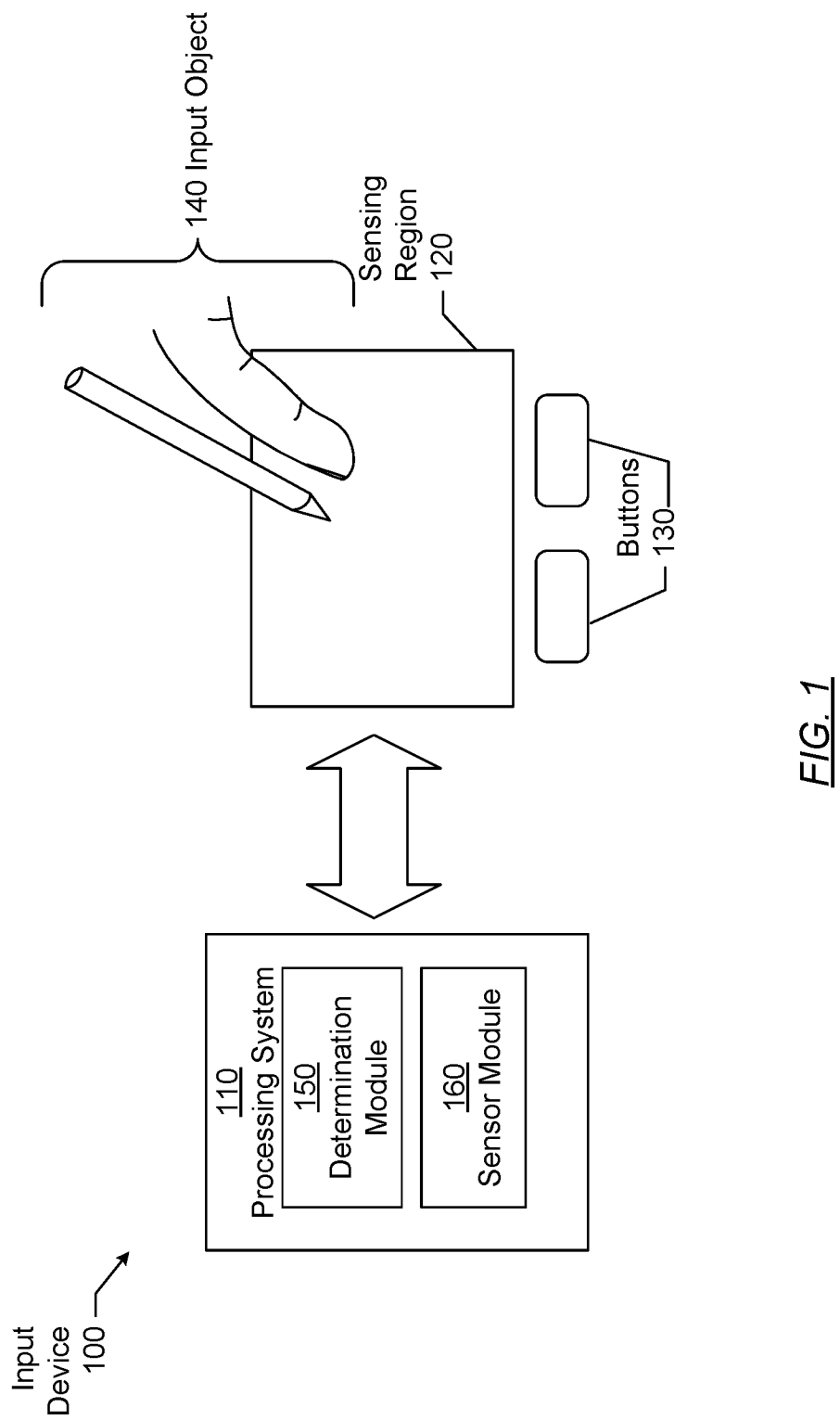
FIG. 1 shows a block diagram of an example system that includes an input device in accordance with one or more embodiments.

Specific embodiments of the invention will now be described in detail with reference to the accompanying figures. Like elements in the various figures may be denoted by like reference numerals and/or like names for consistency.

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present invention provide input devices and methods that facilitate improved usability. In particular, one or more embodiments are directed to a method performed by an input device that switches between low-power scanning and high-power scanning based on different types of detected input objects. In one or more embodiments, for example, a type of input object is identified in a sensing region using a low-power scanning technique. By identifying the type of input object without entering a high-power scanning mode, the input device may conserve power or reduce interference while an input object of no interest is detected in a sensing region. If the type of input object is of no interest, the input device may continue in a low-power scanning mode. On the other hand, if the type of input object is designated of further interest by a processing system, the input device may switch to a high-power scanning mode to collect more detailed positional information and/or force information regarding the detected input object.

Turning now to the figures, FIG. 1 is a block diagram of an exemplary input device (100), in accordance with embodiments of the invention. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Examples include I2C, SPI, PS/2, Universal Serial Bus (USB), Bluetooth, RF, and IRDA.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object may be used. Although the singular form is used, multiple input objects may exist in the sensing region (120). Further, the particular input objects are in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g., a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) includes one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and, in various embodiments, the reference voltage may be system ground. In some embodiments, transmitter sensor electrodes may be modulated. The transmitter electrodes are modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators/mechanisms (not shown), etc.

The processing system (110) may be implemented as a set of modules that handle different functions of the processing system (110). Each module may include circuitry that is a part of the processing system (110), firmware, software, and/or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module may include sensor circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Alternative or additional modules may exist in accordance with one or more embodiments. Such alternative or additional modules may correspond to distinct modules or sub-modules of one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, haptic actuation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments are described in the context of a fully-functioning apparatus, the mechanisms of the various embodiments are capable of being distributed as a program product (e.g., software) in a variety of forms. For example, the mechanisms of various embodiments may be implemented and distributed as a software program on information-bearing media that are readable by electronic processors (e.g., non-transitory computer-readable and/or recordable/writable information bearing media that is readable by the processing system (110)). Additionally, the embodiments may apply equally regardless of the particular type of medium used to carry out the distribution. For example, software instructions in the form of computer readable program code to perform one or more embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion an embodiment may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

One or more embodiments are directed to an electronic system (not shown). In one or more embodiments, the electronic system includes a housing and an input device configured to determine positional and/or force information from a plurality of input objects in a sensing region. In one or more embodiments, the input device includes a rigid support substrate mechanically coupled to the housing, a force sensor coupled to the rigid support substrate, an input surface disposed above the rigid support substrate, and a coupling element disposed through an opening formed in the rigid support substrate, in which the coupling element is disposed between the housing and the rigid support substrate, and in which the coupling element is configured to allow the rigid support substrate to displace in an activation direction relative to the housing. In one or more embodiments, the electronic system also includes a processing system communicatively coupled to the force sensor and configured to determine positional information and/or force information for the plurality of input objects and to actuate a haptic actuator to translate the rigid support substrate in an activation direction.

While FIG. 1 shows a configuration of components, other configurations may be used without departing from the scope of the invention. For example, various components may be combined to create a single component. As another example, the functionality performed by a single component may be performed by two or more components. Accordingly, for at least the above-recited reasons, embodiments of the invention should not be considered limited to the specific arrangements of components and/or elements shown in FIG. 1.

Figure 2:
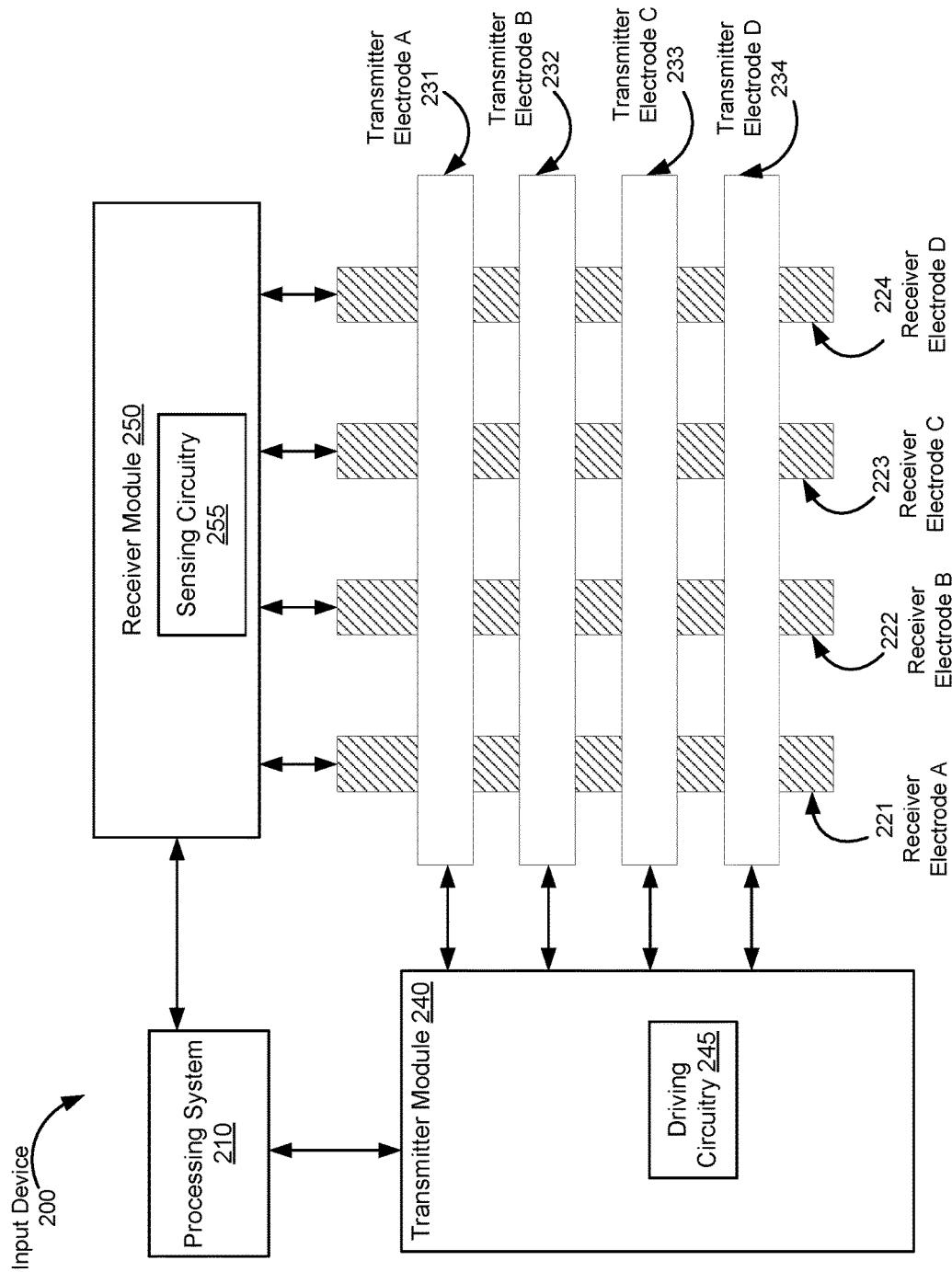
FIG. 2 shows a schematic view of an input device in accordance with one or more embodiments.

Turning to FIG. 2, FIG. 2 shows a schematic view of an input device (200) in accordance with one or more embodiments. As shown in FIG. 2, the input device (200) may include a receiver module (250), a transmitter module (240), and a processing system (210). The processing system (210) may be similar to processing system (110) described in FIG. 1 and the accompanying description. The transmitter module (240) may include driving circuitry (245). For example, driving circuitry (245) may include hardware and/or software that includes functionality to generate one or more sensing signals transmitted over one or more transmitter electrodes (e.g., transmitter electrode A (231), transmitter electrode B (232), transmitter electrode C (233), transmitter electrode D (234)). The transmitter electrodes (231, 232, 233, 234) may be similar to the transmitter electrodes described in FIG. 1 and the accompanying description.

Moreover, the receiver module (250) may include sensing circuitry (255). For example, sensing circuitry (255) may include hardware and/or software that includes functionality to obtain one or more resulting signals from one or more receiver electrodes (e.g., receiver electrode A (221), receiver electrode B (222), receiver electrode C (223), receiver electrode D (224)) in response to one or more sensing signals transmitted over the transmitter electrodes. In particular, the sensing circuitry (255) may include analog-front ends, which may further include various analog conditioning circuitry, such as operational amplifiers, digital-signal processing components, filters, and various application-specific integrated circuits for detecting and analyzing resulting signals obtained from the receiver electrodes (221, 222, 223, 224). Likewise, the receiver electrodes (221, 222, 223, 224) may be similar to the receiver electrodes described in FIG. 1 and the accompanying description.

In one or more embodiments, the input device (200) includes functionality to perform a low-power scan and a high-power scan. For example, a low-power scan may be performed with the input device (200) that uses less electric power than a high-power scan performed by the input device (200). In particular, the low-power scan may have a spatial resolution that is less than the spatial resolution of the high-power scan. In one or more embodiments, for example, the input device (200) monitors only a single axis of a sensing region during the low-power scan. As such, the input device (200) may obtain only one-dimensional positional information on one or more input objects in the sensing region. During the high-power scan, the input device (200) may obtain positional information of an input object in two or more physical dimensions.

In one or more embodiments, the low-power scan operates at substantially the same amount of electric power but with a different scanning interval as the high-power scan. For example, the high-power scan may be performed according to a particular scanning interval. With the low-power scan, the input device (200) may operate in an inactive mode with periodic scans of a sensing region performed over a greater period in time than the scanning interval of the high-power scan.

Moreover, in one or more embodiments, sensing circuitry (255) is operated for only a portion of the receiver electrodes (221, 222, 223, 224) in a low-power scan. For example, one or more of the receiver electrodes (221, 222, 223, 224) may be ganged together during a low-power scan and analyzed with a single analog front end of the sensing circuitry (255). Thus, the single analog front-end may obtain resulting signals for the ganged electrodes for detecting the presence of an input object.

In one or more embodiments, the input device (200) includes functionality to identify a type of input object using one or more low-power scanning techniques. Specifically, identifying a specific type of input object with a low-power scan may be analogous to performing a high-power scan with respect to an input object at a large distance above the sensing region. As the input object at the large distance produces a weak signal response in a high-power scan, a low-power scanning technique may use similar input object classification techniques with weak signal responses. For example, the low-power scanning techniques may include a capacitive beamforming technique. In capacitive beamforming technique, a type of input object may be estimated based on a direction from which the input object is approaching in various contexts (e.g. a user's face approaching at the upper edge of smartphone's input surface during an incoming phone call). As such, the type of input object may be identified using the directivity property where the location of the input object increases within the sensing region in one direction as compared to the other non-sensitive directions within the sensing region. Thus, using a capacitive beamforming technique, a processing system may exclude various types of input objects from the measured capacitive response based on the location of sensitive and non-sensitive directions. In one or more embodiments, a capacitive beamforming technique may change the polarity of various sensing signals transmitted on the transmitter electrodes (231, 232, 233, 234) to identify a type of input object.

In another embodiment, the low-power scanning techniques may include a dynamic block scanning technique. In a dynamic block scanning technique, for example, receiver electrodes may be time-multiplexed and spatially interleaved throughout a sensing region. In particular, a dynamic block scanning technique may allocate all or a substantial portion of sensing resources in an input device (e.g., analog front ends coupled to receiver electrodes and/or a sensing time budget dedicated to the receiver electrodes) to a location of interest or "block", which may be determined from a previous scan of a sensing region. Thus, a dynamic block scanning technique may avoid scanning of an entire sensing region and may only scan a specific "block" or location of interest of the sensing region. Likewise, the dynamic block scan may include reduced power consumption by only scanning a particular portion of the sensing region.

In one or more embodiments, for example, a low-power scanning technique is a spatial gradient-based detection technique. For example, a spatial gradient-based detection technique may determine a type of input object based on relative values of adjacent pixels within a sensing region. In particular, a pixel of a sensing region may correspond to a capacitance value detected during a particular scan of the input device. Thus, the spatial gradient-based detection technique may compare a baseline of capacitance values at various pixels of the sensing region with capacitance values obtained in the low-power scan for similar pixels. Likewise, the spatial gradient-based detection technique may include computing a column-wise gradient and/or a row-wise gradient among the capacitance values. As such, the spatial gradient-based detection technique may be based on a detection algorithm for a specific type of input object. In one or more embodiments, for example, the input device (200) detects a user's face in a sensing region with a spatial gradient-based detection technique. Accordingly, the low-power scan may include functionality to determine whether a face is or is not located in a sensing region.

Figure 3:
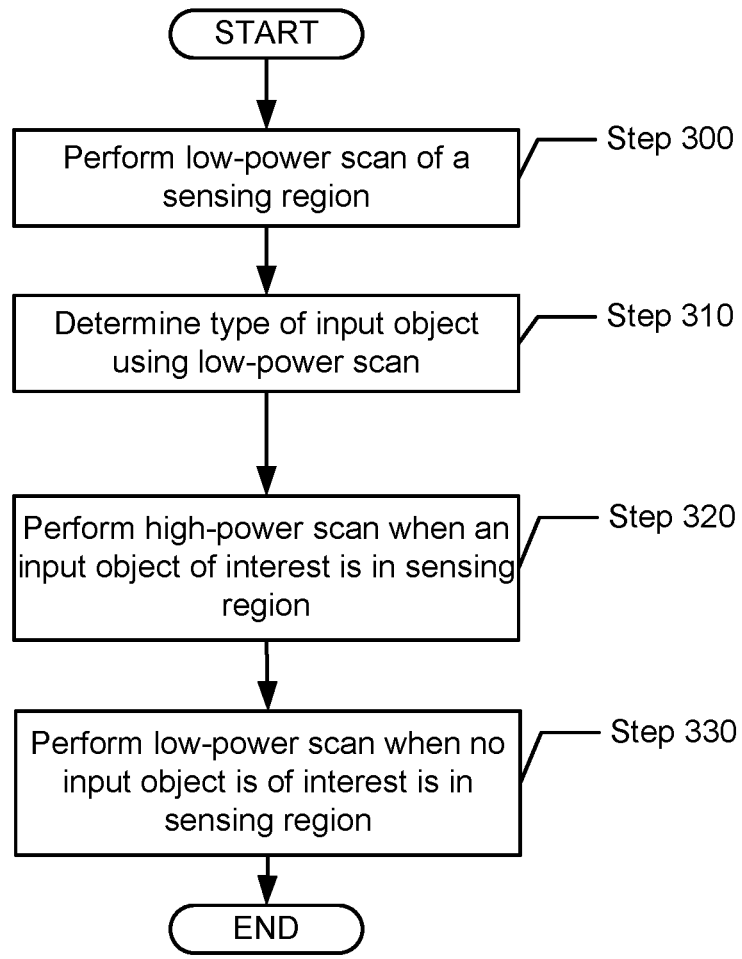
FIG. 3 shows a flowchart in accordance with one or more embodiments.

Turning to FIG. 3, FIG. 3 shows a flowchart in accordance with one or more embodiments. Specifically, FIG. 3 describes a method for operating an input device. The process shown in FIG. 3 may involve, for example, one or more components discussed above in reference to FIGS. 1-2 (e.g., processing system (110)). While the various steps in FIG. 3 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, a low-power scan of a sensing region is performed in accordance with one or more embodiments. For example, when an input device is in a low-power scanning mode of operation, the input device may perform low-power scans until the input device detects an input object. Accordingly, the input device may conserve battery power by performing low-power scans at periodic intervals rather than high-power scanning. Likewise, the low-power scan may be similar to the low-power scan described in FIG. 2 and the accompanying description. Thus, one or more low-power scanning techniques may be performed with respect to a sensing region of an input device to detect and/or identify one or more input objects in the sensing region.

In Step 310, a type of input object is determined using a low-power scan in accordance with one or more embodiments. In one or more embodiments, for example, the low-power scan identifies an input object as among one or more input object types. For example, input object types may include a palm of a user's hand, a user's face, a thumb, an index finger, and a stylus. Thus, the low-power scan may distinguish between a human hand and a stylus in classifying an input object detected in a sensing region with the low-power scan.

In Step 320, a high-power scan is performed when an input object in a sensing region is of interest in accordance with one or more embodiments. In one or more embodiments, for example, an input device switches from a low-power scanning technique to a high-power scanning technique when a particular type of input object is detected in Step 310. Specifically, if a user's fingers are objects of interest, then the input device may switch to a high-power scan when a thumb and/or index finger is detected by the low-power scan in Step 300. In one or more embodiments, if no objects of interest are detected, the input device switches from a high-power scan to a low-power scan until another object of interest is detected in the sensing region.

During a high-power scanning technique, for example, an input device may obtain positional information and/or force information regarding an input object that is identified as being of interest. For example, force sensor electrodes in an input device may be in an inactive mode while the low-power scan is performed in Step 300. Once an object of interest is detected using the low-power scan in Step 310, the input device may proceed to collect force information on one or more input forces applied by the input objects to an input surface. When no objects of interest are detected during the high-power scan, the input device may deactivate the force sensor electrodes accordingly. Moreover, the positional information detected with the high-power scan may include more detailed positional information than the type of positional information determined with respect to the input object in Step 310.

In Step 330, a low-power scan is performed when no input object in a sensing region is of interest in accordance with one or more embodiments. In particular, when an object of interest leaves the sensing region, an input device may return to Step 300 and Step 310 until a new object of interest is detected using a low-power scan in the sensing region.

In one or more embodiments, the low-power scan is performed to eliminate input device interference. For example, where an input device is located on a mobile phone, high-power scanning may generate audible noise during a phone call performed using the mobile device. Accordingly, when the input device detects an object of no interest, such as a user's face during the phone call, low-power scanning may produce less interference and/or noise than a respective high-power scan. For example, in a high-power scan similar to the high-power scan in Step 320, the high-power scan may induce an electrical potential difference between various electrodes in the input device and a grounded user holding the input device. Thus, the electrical potential difference may be a source of interference that affects proximity scanning and/or other electrical components, such as various integrated circuits, operating within the input device.

Figure 4:
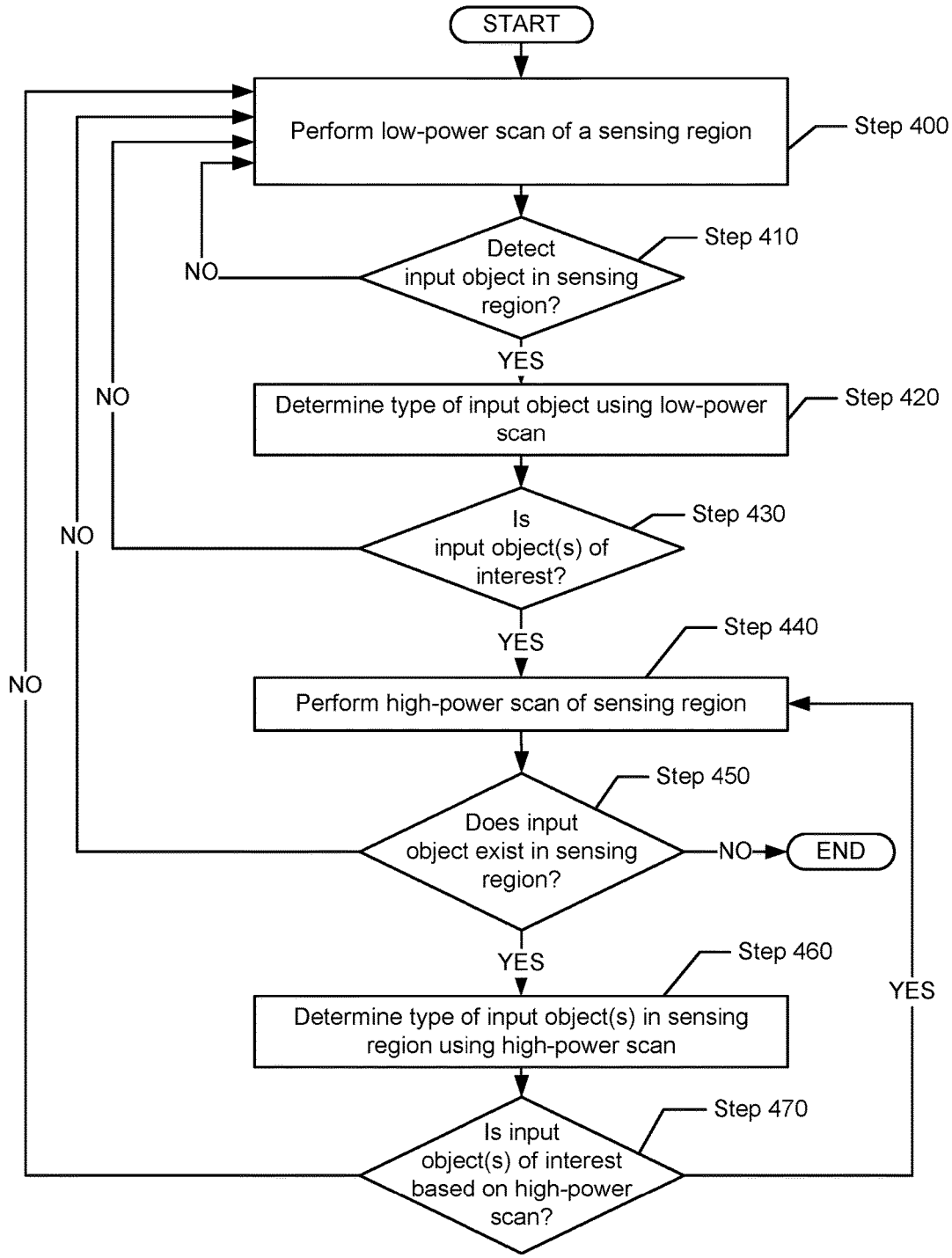
FIG. 4 shows a flowchart in accordance with one or more embodiments.

Turning to FIG. 4, FIG. 4 shows a flowchart in accordance with one or more embodiments. Specifically, FIG. 4 describes a method for operating an input device. The process shown in FIG. 4 may involve, for example, one or more components discussed above in reference to FIGS. 1-2 (e.g., processing system (110)). While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, a low-power scan of a sensing region is performed in accordance with one or more embodiments. In one or more embodiments, for example, Step 400 may be similar to Step 300 described above in FIG. 3 and the accompanying description. Moreover, in one or more embodiments, low-power scanning methods may correspond proximity detection methods that produce low amounts of interference in an input device. In contrast, high-power scanning method may correspond to proximity detection methods that generate greater amounts of interference than the low-power scanning methods. Accordingly, the methods described in FIGS. 3 and 4 and the accompanying description may also be described in connection with low-interference scans and high-interference scans in place of low-power scanning techniques and high-power scanning techniques.

In Step 410, a determination is made whether an input object is detected in a sensing region in accordance with one or more embodiments. Based on the low-power scan performed in Step 400, an input device may detect whether an input object is located in a sensing region. When a determination is made that an input object is located in a sensing region, the process may proceed to Step 420. When a determination is made that no input objects are located in the sensing region, the process may proceed to Step 400.

In Step 420, a type of input object is determined using low-power scan in accordance with one or more embodiments. In one or more embodiments, for example, Step 420 may be similar to Step 310 described above in FIG. 3 and the accompanying description.

In Step 430, a determination is made whether an input object is of interest in accordance with one or more embodiments. In one or more embodiments, a set of input objects are classified as objects of interest. For example, a processing system coupled to an input device may store in memory, firmware, or using any other storage method different types and/or subtypes of objects categorized as being of interest. An object of interest may trigger a high-power scan of a sensing region, while an object of no interest may be ignored, e.g., detection of an object of no interest may cause an input device to continue with a low-power scanning mode. As such, the processing system may compare one or more types of input objects identified in Step 420 with one or more types of input objects designated as objects of interest and/or objects of no interest. In one embodiment, for example, various fingers and/or styluses may be designated as objects of interest. When a different type of input object is determined in Step 420, such a palm or face, the processing system may determine that the input object is of no interest.

Furthermore, in one or more embodiments, different input objects are classified as objects of interest or objects of no interest depending on different types of low-power scanning modes. For example, in response to a user receiving a phone call, an input device in the phone may enter a low-power scanning mode that designates the user's face as an object of no interest for the duration of the phone call. As such, the input device in the phone may continue to perform a low-power scan while the user's face is detected. Once the phone call ends, the input device may enter a different type of low-power scanning mode that changes a user's face to an object of interest.

In one or more embodiments, an input object is designated an object of interest based on an interface action within a graphical user interface. In particular, a software application operating on an electronic system may perform different interface actions based on positional information and/or force information from specific types of input object. For example, if a haptic response is generated when a finger exerts a specific amount of input force to an input surface, the input device may first identify whether a finger is located in the sensing region. Upon detecting a finger, the input device may then perform force sensing in addition to proximity sensing. Thus, the haptic response may only be generated when an object of interest, i.e., the finger, is detected in Step 430 as exerting the required amount of input force to the input surface.

When a determination is made that an object of interest is located in a sensing region based on a low-power scan, the process may proceed to Step 440. When a determination is made that one or more input objects in the sensing region are of no interest based on the low-power scan, the process may proceed to Step 400.

In Step 440, a high-power scan of a sensing region is performed in accordance with one or more embodiments. In response to an object of interest being determined in Step 430, an input device may proceed to perform a high-power scan of a sensing region. For example, the high-power scan may be similar to the high-power scan in Step 320 described above in FIG. 3 and the accompanying description.

In Step 450, a determination is made whether an input object exists in a sensing region in accordance with one or more embodiments. During the high-power scan in Step 440, one or more input objects may enter or leave the sensing region. Thus, an input device may continually monitor a sensing region to determine whether any input objects remain. When a determination is made that an input object still exists in the sensing region, the process may proceed to Step 460. When a determination is made that no input objects are still in the sensing region, the process may proceed to Step 400 or end the process.

In Step 460, a type of input object is determined using high-power scan in accordance with one or more embodiments. For example, a processing system may obtain positional information and/or force information with respect to one or more input devices in a sensing region using the high-power scan. With the positional information and/or force information, a particular type of input object may be identified.

In Step 470, a determination is made whether an input object is of interest based on a high-power scan in accordance with one or more embodiments. In one or more embodiments, various input objects may be designated as objects of interest during a high-power scan. Similar to Step 430, a processing system may determine whether an object of interest is located in a sensing region of an input device. In one or more embodiments, the objects of interest during the high-power scan are different from the objects of interest during the low-power scan. Likewise, objects of interest during the high-power scan may be based on one or more software applications operating in an electronic system containing the input device. For example, objects of interest during the high-power scan may be designated based on various interface actions performed within a graphical user interface. When a determination is made that an object of interest is located in a sensing region based on a high-power scan, the process may proceed to Step 440. When a determination is made that one or more input objects in the sensing region are of no interest based on the high-power scan, the process may proceed to Step 400.

Turning to FIGS. 5.1 and 5.2, FIGS. 5.1 and 5.2 provide an example of a method for switching between low-power scanning modes and high-power scanning modes. The following example is for explanatory purposes only and not intended to limit the scope of the invention.

In FIG. 5.1, an input device (not shown) performs a low-power scan of a sensing region. Specifically, a processing system (not shown) coupled to the input device obtains various low-power scan results (e.g., low-power scan results A (511)) that includes various scanning attributes of input objects in the sensing region (e.g., number of input objects (521), and types of input objects (522). As shown in FIG. 5.1, the low-power scan results A (511) identifies one input object in a sensing region of the input device that is a user's face. For example, a low-power scan may be able to determine a general presence of an input object or coarse positioning of a user's face and/or palm relative to an input surface (e.g., screen of a tablet or smartphone). The processing system analyzes the low-power scan results A (511) using an objects-of-interest function (550) to determine whether a face is an object of interest. In particular, the objects-of-interest function (550) is preprogrammed with a user's finger, and a thumb, and a stylus as being objects of interest. Moreover, the objects-of-interest function (550) is programmed to designate any other input objects as objects of no interest. Accordingly, using the objects-of-interest function (550), the processing system determines that the user's face is an object of no interest. Likewise, a user's palm may be also be an object of no interest, and thus a palm, for example, may also trigger a low-power scan. Thus, the input device proceeds to remain in a low-power scanning mode (580).

Turning to FIG. 5.2, the input device performs a low-power scan of a sensing region. Specifically, the processing system obtains low-power scan results B (512). As shown in the low-power scan results B (512), the processing system determines an index finger and a thumb are located in a sensing region of the input device. The processing system analyzes the low-power scan results B (512) using the objects-of-interest function (550) to determine that both the index finger and the thumb are objects of interest. Accordingly, the processing system causes the input device to enter a high-power scanning mode.

Keeping with FIG. 5.2, during the high-power scanning mode, the processing system obtains various high-power scan results (e.g., high-power scan results A (531), high-power scan results B (532)). Initially, the input device generates the high-power scan results A (531) that identifies various scanning attributes (e.g., types of input objects (522), positional information (523), force information (524)) of the input objects in a sensing region. Specifically, the processing system determines that the index finger and the thumb are still located in the sensing region as previously determined with the low-power scan results B (512). Accordingly, the processing system determines that the index finger is located at coordinates (a, b) and the thumb is located at coordinates (c, d). Moreover, the processing system also detects force information regarding an input force generated by the index finger and/or the thumb equivalent to 2.1 Newtons.

Based on the high-power scan results A (531), the input device continues with the high-power scanning mode. In the next high-power scan, the processing system obtains high-power scan results B (532). In the high-power scan results B (532), the processing system now determines that the index finger and the thumb have left the sensing region, while a user's face is the only remaining input object detected in the sensing region. The processing system obtains positional information and force information regarding the user's face. However, using the objects-of-interest function (550), the processing system determines that the user's face is an object of no interest. Accordingly, the processing system transfers the input device to the low-power scanning mode (580).

Embodiments may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the invention.

The computing system or group of computing systems described in FIGS. 6.1 and 6.2 may include functionality to perform a variety of operations disclosed herein. For example, the computing system(s) may perform communication between processes on the same or different systems. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until the server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (600) in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections).

Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or a data container (e.g., database, table, record, column, view, etc.), identifier(s), conditions (e.g., comparison operators), functions (e.g., join, full join, count, average, etc.), sort (e.g., ascending, descending), or others. The DBMS may execute the statement. For example, the DBMS may access a memory buffer, a reference or index a file for reading, writing, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 6.1 and the nodes and/or client device in FIG. 6.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system coupled with an input device, comprising:
a sensor module, the sensor module configured to:
perform a first low-power scan to detect a first input object in a sensing region of the input device; and
a determination module, the determination module configured to:

determine, using the first low-power scan, a type of input object corresponding to the first input object in the sensing region, and compare the type of input object with a predetermined set of input object types to determine whether the first input object is an object of interest based on whether the type of input object is among the predetermined set of input object types;

when the first input object is the object of interest, perform, by the sensor module, a first high-power scan of the sensing region, and when the first input object is an object of no interest, perform, by the sensor module, a second low-power scan of the sensing region.

2. The processing system of claim 1,
wherein the sensor module is further configured to:
perform a second high-power scan of the sensing region to detect a second input object in the sensing region,
when the second input object is the object of no interest, perform a third low-power scan of the sensing region; and
wherein the determination module is further configured to:
determine, using the second high-power scan, whether the second input object is the object of interest.

3. The processing system of claim 1,
wherein the object of interest is a finger of a user, and
wherein the object of no interest is a face of the user.

4. The processing system of claim 1,
wherein the first low-power scan has a first spatial resolution that is less than a second spatial resolution of the first high-power scan.

5. The processing system of claim 1,
wherein the sensor module comprises sensor circuitry coupled to a plurality of receiver electrodes,
wherein the low-power scan obtains a first plurality of resulting signals from a first subset of receiver electrodes, and
wherein the first high-power scan obtains a second plurality of resulting signals from a second subset of receiver electrodes that is greater than the first subset of receiver electrodes.

6. The processing system of claim 1,
wherein the first low-power scan obtains a first plurality of resulting signals from a first plurality of receiver electrodes along a single axis of the sensing region, and
wherein the first high-power scan obtains a second plurality of resulting signals from a second plurality of receiver electrodes along two axes of the sensing region.

7. The processing system of claim 1,
wherein performing the first low-power scan comprises performing a spatial gradient-based detection technique.

8. The processing system of claim 1,
wherein the first low-power scan obtains a first plurality of resulting signals from a first plurality of receiver electrodes along a single axis of the sensing region, and
wherein the first high-power scan obtains a second plurality of resulting signals from a second plurality of receiver electrodes along two axes of the sensing region.

9. An input device, comprising:
a plurality of transmitter electrodes configured to transmit one or more sensing signals;
a plurality of receiver electrodes configured to obtain a plurality of resulting signals in response to transmitting the one or more sensing signals; and
a processing system operatively connected to the plurality of receiver electrodes and the plurality of transmitter electrodes, the processing system configured to:
perform a first low-power scan to detect a first input object in a sensing region;
determine, using the first low-power scan, a type of input object corresponding to the first input object in the sensing region;
compare the type of input object with a predetermined set of input object types to determine whether the first input object is an object of interest based on whether the type of input object is among the predetermined set of input object types;
when the first input object is the object of interest, perform a first high-power scan of the sensing region; and
when the first input object is an object of no interest, perform a second low-power scan of the sensing region.

10. The input device of claim 9, wherein the processing system is further configured to:
perform a second high-power scan of the sensing region to detect a second input object in the sensing region,
when the second input object is the object of no interest, perform a third low-power scan of the sensing region; and
determine, using the second high-power scan, whether the second input object is the object of interest.

11. The input device of claim 9,
wherein the object of interest is a finger of a user, and
wherein the object of no interest is a face of the user.

12. The input device of claim 9,
wherein the first low-power scan has a first spatial resolution that is less than a second spatial resolution of the first high-power scan.

13. The input device of claim 9, further comprising:
sensor circuitry coupled to a plurality of receiver electrodes,
wherein the first low-power scan obtains a first plurality of resulting signals from a first subset of receiver electrodes, and
wherein the first high-power scan obtains a second plurality of resulting signals from a second subset of receiver electrodes that is greater than the first subset of receiver electrodes.

14. A method, comprising:
performing a first low-power scan to detect a first input object in a sensing region of an input device;
determining, using the first low-power scan, a type of input object corresponding to the first input object in the sensing region;
comparing the type of input object with a predetermined set of input object types to determine whether the first input object is an object of interest based on whether the type of input object is among the predetermined set of input object types;
when the first input object is the object of interest, performing a first high-power scan of the sensing region; and
when the first input object is an object of no interest, performing a second low-power scan of the sensing region.

15. The method of claim 14, further comprising:
performing a second high-power scan of the sensing region to detect a second input object in the sensing region,
when the second input object is the object of no interest, performing a third low-power scan of the sensing region; and
determining, using the second high-power scan, whether the second input object is the object of interest.

16. The method of claim 14,
wherein the object of interest is a finger of a user, and
wherein the object of no interest is a face of the user.

17. The method of claim 14,
wherein the first low-power scan has a first spatial resolution that is less than a second spatial resolution of the first high-power scan.

\* \* \* \* \*